Patented Dec. 20, 1938

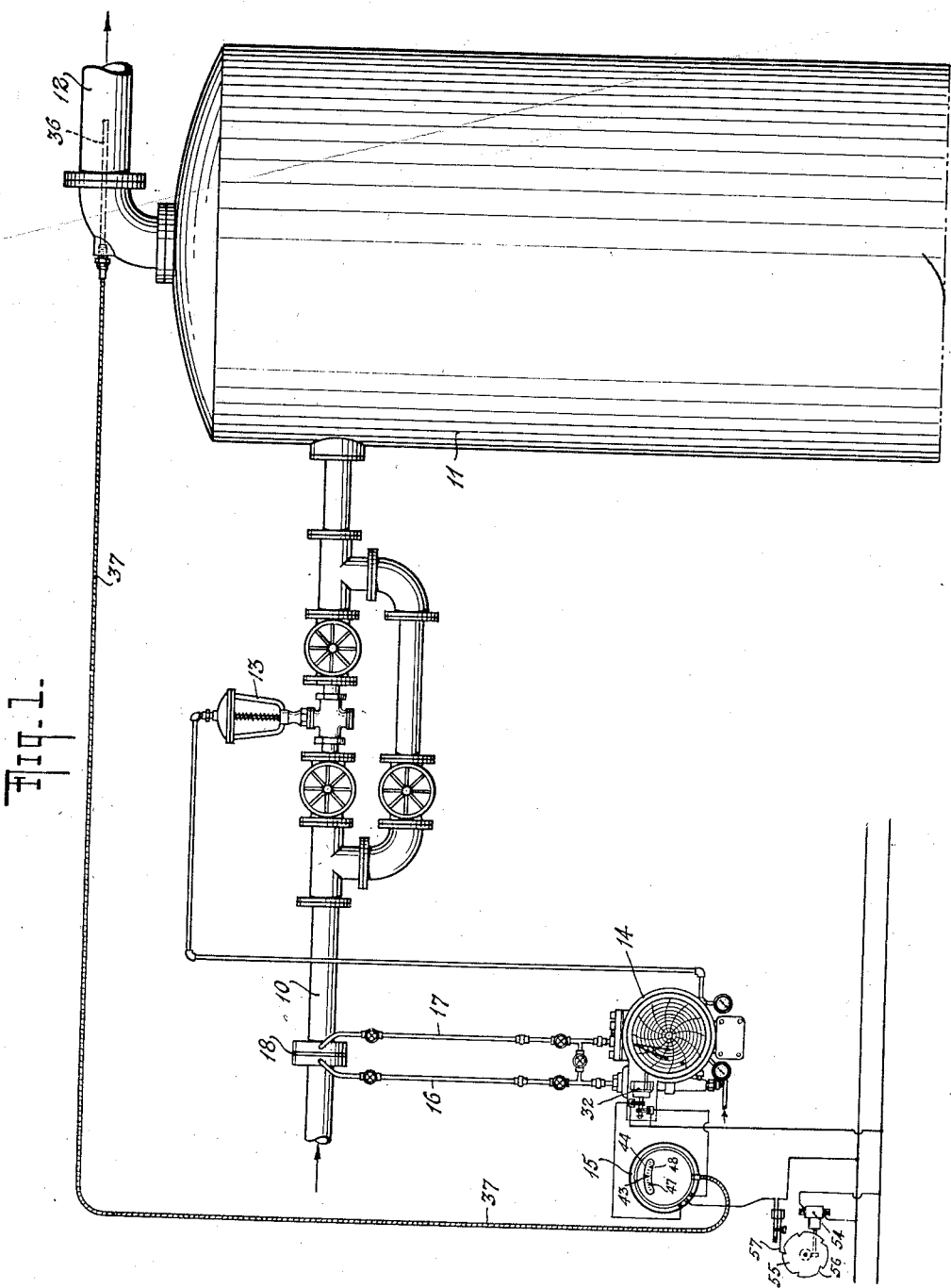

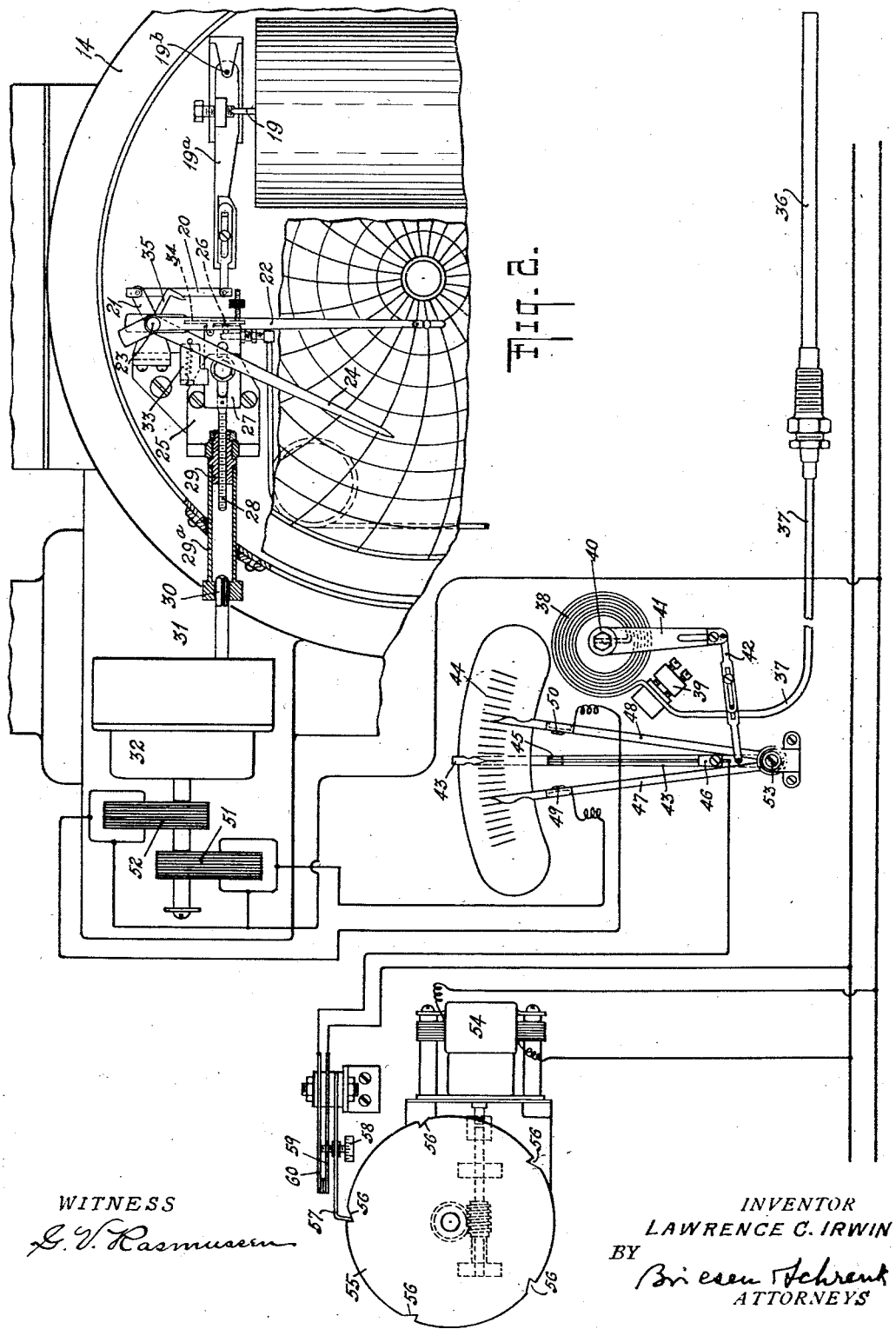

2,140,747

UNITED STATES PATENT OFFICE 2,140,747

TEMPERATURE OR PRESSURE CONTROL BY FLOW REGULATION

Lawrence C. Irwin, Brooklyn, N. Y., assignor to Charles J. Tagliabue Mfg. Co., Brooklyn, N. Y., a corporation of New York Application January 16, 1933, Serial No. 651,972

18 Claims. (Cl. 236—84)

The present invention relates to the control of the temperature or pressure within an apparatus to which is charged a fluid of any suitable or appropriate kind, and relates in particular to a temperature or pressure control mechanism, whereby the control is effected with the aid of a flow controller in such a manner that predetermined temperature or pressure conditions are maintained irrespective of fluctuations in the pressure or rate at which said fluid is supplied, and of fluctuations of other variable factors, such as heating or cooling, to which the apparatus may be subjected.

It is an object of the invention to provide a mechanism of the type indicated wherein the flow of fluid into an apparatus under control may be regulated or throttled with so high a degree of sensitivity that "hunting" is practically eliminated and a time-temperature or time-pressure curve is obtained which is free of violent oscillations or departures from the desired or predetermined temperature or pressure. More specifically, it is an object of the invention to provide a temperature or pressure controller arrangement which is sensitively responsive not only to changes in the temperature or pressure at the place under control, but also to changes in the pressure at which the medium flowing to the apparatus is supplied, so that, when changes occur simultaneously in the controlled temperature or pressure and in the pressure of said medium, an integrated control impulse, which is the algebraic sum of the individual impulses, is transmitted to the controlled member, which is usually a valve. It is a further object of the invention to provide an arrangement wherein the operation of a flow controller is modified by electrically operated mechanism responsive to variations in the temperature or pressure at the place under control from the desired temperature or pressure, adjustments in the rate of flow being made, if desired, by degrees, that is, intermittently, and not by rapid continuous changes in the rate of flow of the fluid medium.

In the preferred embodiment of the present invention, the temperature or pressure at a selected point is controlled with the aid of a flow control means supervised by an electrical mechanism which is under the influence of temperature or pressure responsive means. The electrical mechanism is actuated by the temperature or pressure responsive means when the temperature or pressure at the place under control is at or beyond predetermined limiting conditions to vary the control point, i. e. the differential pressure setting, of the flow controller. The flow controller in turn regulates the position of a control valve arranged in the fluid supply conduit, thereby regulating the rate of flow of such fluid into the apparatus under control. The flow controller may be of any known or suitable type and is responsive to variations in the pressure or rate of supply of the fluid whose admission into the apparatus is to be controlled. As the setting of the flow controller is subject to the control of the temperature or pressure responsive mechanism, the adjustment of the controlled valve is dependent not only upon fluctuations in the pressure or rate of flow of the fluid but also upon fluctuations in the temperature or pressure at the place or apparatus under control. The controlled valve may be, and preferably is, of the air-operated diaphragm type, the degree of opening of the valve being regulated by variation of the pressure of the air acting on the diaphragm thereof under the control of the flow controller.

An interrupter device may be employed in association with my improved control mechanism. The interrupter operates automatically to cause the conditions in the apparatus under control to be ascertained or sensed periodically and permits any necessary adjustment of the control valve to be effected only at timed intervals. Such interrupter mechanism is of especial advantage where the temperature or pressure in the controlled apparatus changes only slowly; the interrupter may thus be made to effect adjustment of the control valve for only a small degree at a time, so that a suitable time interval is permitted to elapse between successive partial adjustments to enable the results of the last adjustment to manifest themselves and to be transmitted by the temperature or pressure responsive mechanism to the electrical mechanism. The electrical mechanism may include contacts which at the predetermined limiting conditions cause actuation of a suitable electrical device, such as a motor, in one or the other direction, to make an appropriate adjustment of the flow controller. The interrupter is so associated with the electrical mechanism that, if at the end of an interval following a partial adjustment of the flow controller, one or the other contact of the electrical mechanism is still closed, a further partial adjustment is made and a similar time interval allowed to elapse, such stepwise adjustment being continued until that position of the control valve is reached at which the temperature or pressure is between the predetermined limiting conditions.

While my invention is capable of utilization in numerous industrial fields, the same is of particular advantage in controlling the flow of mineral oil to an oil still whose vapors are to be maintained at a predetermined constant temperature or range of temperatures. The invention will accordingly be described as applied to an oil still for maintaining the discharged vapors within predetermined temperature limits, but it is to be understood that the illustrated embodiment is presented by way of example only and is not to be considered as limiting the scope of the invention.

On the accompanying drawings,

Fig. 1 is a diagrammatic view of an oil still with my improved control apparatus associated therewith; and Fig. 2 is an enlarged view of the control mechanism forming the subject-matter of the present invention.

Referring to the drawings, the numeral 10 indicates an oil line leading to an oil still 11 of any suitable or known construction, the oil vapors being discharged through a pipe 12. To insure uniformity in the oil fractions discharged from the still, it is essential that the temperature of the vapors leaving the still through the pipe 12 be maintained substantially constant or within predetermined limits. This result is effected according to the present invention by the adjustment of a control valve 13 both in response to fluctuations in the rate of flow or pressure of the oil flowing through the pipe 10 and in response to fluctuations in the temperature in the pipe 12 from a predetermined temperature or range of temperature. According to the present invention, proper adjustment of the valve 13 to permit only so much oil to flow into the still as will enable a predetermined range of temperature to be maintained in the pipe 12, is effected with the aid of a flow meter and controller 14 and a temperature responsive device 15, the arrangement being such that the differential pressure setting or control point of the flow controller 14 is varied by the temperature responsive device 15 in response to the fluctuations in the temperature of the oil vapors in such a manner as to adjust the flow to the required degree. In other words, the setting of the flow meter and controller 14 is under the supervision of the temperature responsive device and it is only as the flow controller setting point is changed by the operation of the temperature responsive device that the rate of flow through the control valve is altered; however, the flow controller, in maintaining the flow rate corresponding to its setting, will, in performing its own flow control activities, be permitted to open or throttle the valve 13 to compensate for fluctuations in the oil supply pressure to assure continuance of the flow at the rate demanded by the setting effected by the temperature responsive device.

The flow meter and controller 14 and temperature responsive device 15 may be of any known construction and no novelty is claimed for either of the illustrated devices per se. The present invention resides in the novel and improved combination of a flow controller and temperature responsive device, whereby the control action of the flow controller is subject to the supervision of and modification by the temperature responsive device 15, so that the control valve is adjusted, not primarily to keep the rate of flow constant, but to keep the temperature of the vapors issuing through pipe 12 within desired limits.

In the arrangement illustrated the flow controller includes two orifice tubes 16 and 17 which project into the pipe 10 at the high pressure and low pressure sides, respectively, of an orifice plate 18. The tubes 16 and 17 are connected to a manometer containing a quantity of mercury, the fluctuations in the rate of flow or pressure of the oil flowing through the pipe 10 producing corresponding fluctuations in the level of a float positioned in known manner in the well of mercury, the movements of such float being transmitted by the member 19 to a lever 19a (see Fig. 2) pivoted at 19b to a bracket fixed within the controller casing. The lever 19a is connected by a link 20 with an arm 21 rigid with a pen arm 22 which is mounted to rotate upon a pivot 23. It will be evident that vertical oscillation of the lever 19a will cause the pen arm 22 to sweep across the chart of the flow controller 14.

A setting pointer 24 is loosely mounted upon the pivot 23 and is movable with an adjustable nozzle arrangement 25, so as to indicate the position of the latter at any instant. The nozzle arrangement includes a nozzle 26 mounted upon a block 27 from which extends a threaded stem 28. The latter is received within an internally threaded nut 29 fixed to a sleeve 29a which is connected by a square shaft 30 with a reduction gearing 31 driven by a reversible motor 32, as will be explained more fully hereinbelow. Upon rotation of the motor in one or the other direction, the sleeve 29a and nut 29 are correspondingly rotated and cause longitudinal adjustment of the block 27 toward the right or left. The setting pointer is urged by a spring against the stop 33 mounted upon the block 27, so that the position of the nozzle orifice is indicated by the pointer 24. The nozzle orifice is controlled by a flapper 34 pivoted intermediate its ends to the block 27. The upper end of the flapper is arranged to be tilted by a finger 35 mounted upon the pivot 23 to move with the pen arm 22. The arrangement of the parts is such, that when the flow through the valve 13 exceeds the amount predetermined at any instant by the position of the pointer 24, the pen arm 22 will be swung by the lever 19a so far in a clockwise direction that the finger 35 will tilt the flapper 34 to expose the nozzle orifice to a greater degree. Tilting of the flapper valve will cause discharge of air from an air relay or pilot valve (not shown) which in turn controls the degree of air pressure acting upon the diaphragm of the control valve 13. The nozzle orifice arrangement just described and the associated air relay and the manner in which the latter controls the adjustment of the diaphragm motor valve are described in detail in the United States patent to Frank J. Bast, No. 1,837,397.

A thermostatic bulb 36 is located in the discharge pipe 12 of the oil still and is connected by capillary tubing 37 with a Bourdon pressure coil 38 positioned within the casing of the temperature responsive device 15. The outer end of the coil 38 is clamped to a bracket 39 while its inner end is connected with a rotary pivot 40, to which is attached an arm 41. The latter is connected by an adjustable link 42 to a pointer arm 43 playing over a scale 44 and provided with a neutral contact 45 which is insulated from such pointer by an insulating block 46. The pointer 43 and its contact 45 are arranged between two setting arms 47 and 48 bearing insulated contacts 49 and 50, respectively, and connected to the two motor field coils 51 and 52 of opposite polarity. Fluctuations in the temperature in the pipe 12 cause oscillation of the pointer 43 in one or the other direction, and as the temperature of the vapors reaches a predetermined minimum or maximum, as established by the position of the arms 47 and 48, a circuit is closed to one or the other of the coils to cause movement of the motor in one or the other direction. Actuation of the motor causes rotation of the sleeve 29a and nut 29 and corresponding adjustment of the block 27 and the nozzle 26 and flapper 34 carried thereby. The pointer 43 is loosely mounted upon a shaft 53 while the arms 47 and 48 are frictionally clamped to such shaft.

In certain situations, as when the change in temperature of the vapors follows only slowly after change in the regulation of the control valve 13, it is desirable to cause adjustment of the control valve by small increments at a time so as to avoid hunting, i. e. alternate fluctuation of the oil vapor temperature above and below the desired control temperature until such desired temperature is finally established. Such stepwise adjustment of the control valve may be accomplished with the aid of an interrupter which is constantly driven by a motor 54, the interrupter, in the form illustrated, comprising a disc 55 provided with a plurality of notches 56 and engaged by a rider 57. The rider 57 falls into the successive notches 56 at suitably spaced time intervals whose magnitude will depend upon the spacing of the notches and the speed of the motor 54. When the rider engages a raised portion of the cam it causes a screw abutment 58 fixed thereto and passing loosely through an aperture in a spring contact arm 59 to hold a contact 60 out of engagement with the contact 59. When, however, the rider falls into a notch 56, the screw 58 is retracted, and permits the contacts 59, 60 to close. The contacts 59, 60 are in series with the neutral contact 45 of the temperature responsive device 15, so that the motor 32 will be actuated in one or the other direction only when the contacts 59, 60 are closed and the neutral contact 45 engages one or the other of the contacts 49 and 50. Where a pyrometer is employed, the interrupter 53 may be dispensed with, as in such case the pyrometer circuit itself is usually intermittently closed.

The operation of the above described mechanism is as follows:

In the normal operation of the control mechanism, the pointer arm 43 is positioned between the arms 47, 48, as shown in Fig. 2. The interrupter device 53 continues to operate and intermittently closes the contacts 59, 60, but in the position of the pointer arm 43 shown in Fig. 2 the circuits to the motor 32 remain open. Under these conditions, the nozzle 26 is throttled to the proper degree by the flow controller and the control valve 13 assumes a corresponding position, wherein the rate of flow of oil into the still is such as to keep the temperature of the issuing oil vapors within the prescribed range. The nozzle 26, and hence the control valve 13, during such time are solely under the control of the flow controller and variations in the pressure or rate of flow of the supplied oil will be compensated by suitable adjustment of the valve 13 by throttling of the nozzle 26 to a greater or less degree. As soon, however, as the temperature of the oil vapors reaches or falls below the minimum temperature limit, the contacts 45 and 49 are closed, and the next time that a recess 56 in the interrupter cam 55 is presented to the rider 57, a circuit is closed through the contacts 45, 49 and the contacts 59, 60 to the coil 51, whereupon the motor is rotated in a direction to cause the block 27 and nozzle 26 to be moved toward the right. This rightward movement of the block 27 causes the flap 34 to be tilted to a greater degree by the finger 35 and to expose the nozzle orifice to a greater extent, whereby the pneumatic pressure on the diaphragm of valve 13 is increased to cause movement of the valve toward its closed position to decrease the flow of oil. As soon as the rider 57 leaves the notch 56, the circuit to the motor 32 is opened and a short interval or time is permitted to elapse until the results of the new adjustment of the valve 13 have manifested themselves. If, when the rider 57 again falls into a notch 56, the contacts 45, 49 are still closed, the circuit to the motor 32 will again be closed and cause movement of the block 37 farther to the right to expose the nozzle 26 still more and thereby cause further throttling of the valve 13. This adjustment of the block 27 is repeated intermittently until the rate of delivery of oil into the still has been reduced to such an extent as to cause the contact 45 to separate from the contact 49 and assume the intermediate position shown in Fig. 2.

When, on the other hand, the temperature of the vapors issuing from the still reaches or exceeds the prescribed maximum, contact 45 will engage contact 50 and through the intermittent closing of the contacts 59, 60 will periodically energize the field coil 52 of the motor 32 and cause periodic leftward movement of the block 27 to release the flapper 34 to a greater and greater extent from the tilting action of the finger 35 to cause movement of the valve 13 to a greater and greater extent toward its fully open position. The flow of oil to the still is under such conditions increased step by step until it reaches the value at which the temperature of the issuing vapors is within the range predetermined by the setting of the arms 47 and 48.

The change speed gearing 32 may be used in place of the interrupter 55, or, as illustrated, both devices may be employed. As already indicated, the object of these speed reducing devices is to synchronize the rate of adjustment of the nozzle 26 by the motor 32 to the rapidity with which changes in the flow of fluid through the valve 13 are sensed by the temperature or pressure responsive mechanism; that is, the rate of adjustment of the nozzle is determined by the sensitivity of the temperature or pressure responsive mechanism, or by the rate at which the contents of the apparatus 11 heat up or cool down.

It will be clear from the above that there is no fixed relationship between the positions of the control valve and the temperature or pressure responsive mechanism, since the valve position depends also on the rate of flow of the fluid passing therethrough. It will also be noted that when the control valve is adjusted stepwise, as when an interrupter is used, the degree of adjustment of the valve may be quite independent of the degree of deflection of the responsive mechanism (e. g. the neutral arm 43), the adjustment of the valve lagging the responsive mechanism.

While in the above I have described my invention as embodied in a temperature control system, it will be evident that the illustrated mechanism can readily be adapted by known expedients for use in controlling the pressure at a selected place.

It will be understood that the construction illustrated may be modified in various ways within the scope of the appended claims to adapt the same for different situations without departing from the spirit of the invention. Thus, where an apparatus is controlled in which the time lag between the change in the flow of a medium into or from the apparatus and the response of the temperature or pressure responsive mechanism to such change is small, the interrupter mechanism 53 may be dispensed with.

I claim:

1. An arrangement for the control of a physical condition in an apparatus under control, comprising means sensitive to changes in said physical condition and arranged to respond to fluctuations in said condition in such apparatus, electric contact mechanism operatively associated with said sensitive means and comprising high and low contacts adapted to be set for the limits within which the said condition at the place under control is to be maintained, a conduit associated with said apparatus, a valve in said conduit, a flow controller associated with the valve for adjusting the position of the same to compensate for fluctuations in the rate of flow of the fluid flowing through the conduit, and means controlled by the contact mechanism for varying the setting of the flow controller corresponding to the full correction for fluctuations in said condition to cause suitable adjustment of said valve when the condition at the place under control reaches or exceeds the predetermined limits to maintain said condition within such limits.

2. An arrangement for the control of a physical condition comprising, in combination, a pressure conduit leading to an apparatus under control, a pneumatically operated control valve in said conduit adapted to regulate the flow of a fluid through the latter, a pipe for conducting an operating fluid under pressure to said valve from a source other than said conduit, stationary high and low electrical contacts representing the range within which the said physical condition is to be maintained at the place under control, mechanism responsive to fluctuations in said condition at said place and including a movable neutral contact, regulating mechanism for controlling the pressure in said pipe to regulate the pneumatic pressure upon said valve and arranged to be operated through said contact mechanism to adjust said valve to compensate for changes in the said condition in said apparatus, said regulating mechanism including a reversible motor, said electrical contacts being connected to said motor in such manner that upon engagement of one or the other of said contacts by said neutral contact, the motor is rotated in one or the other direction, and flow control mechanism cooperatively associated with said regulating mechanism to modify the pneumatic pressure upon said control valve in response to changes in the rate of flow of the fluid flowing through said valve.

3. An arrangement for the control of a physical condition comprising, in combination, a pressure conduit leading to an apparatus under control, a pneumatically operated control valve in said conduit, a pipe for conducting an operating fluid under pressure to said valve from a source other than said conduit, means associated with said pipe for governing the pneumatic pressure upon such valve, mechanism responsive to fluctuations in a physical condition in said apparatus and including electric contacts establishing the limits of the permissible range of said fluctuations, a reversible electromagnetic mechanism electrically connected with said contacts and mechanically connected with said governing means to adjust the same and thereby adjust the valve to a position in which said range is normally maintained, and flow control mechanism arranged to act upon said governing means to modify the pressure on said valve and effect a compensatory adjustment of the valve in response to changes in the rate of flow of the fluid flowing through said valve.

4. An arrangement for the control of a physical condition comprising, in combination, mechanism responsive to fluctuations in a physical condition in said apparatus and having electric contacts establishing the limits of the predetermined range of said fluctuations, a reversible motor associated with said contacts so as to turn in one direction as long as one contact is made and in the other direction when the other contact is made, a control valve for regulating the flow of a fluid to an apparatus under control and associated with said reversible motor to be operated in one or the other direction as one or the other of said contacts is closed, and a differential pressure flow indicator and controller responsive to fluctuations in the rate of flow of said fluid to regulate the position of said valve independently of said responsive mechanism.

5. An arrangement for the control of a physical condition in an apparatus under control comprising, in combination, a pneumatically operated control valve adapted to be connected with a source of compressed air, means for governing the pneumatic pressure upon said valve, mechanism responsive to fluctuations in a physical condition in said apparatus and including means determining the control limits of said physical condition, means controlled through said control limit determining means to effect a progressive reduced adjustment of the governing means irrespective of the degree of deflection of the said responsive mechanism beyond said determining means, so that the adjustment of the control valve lags the responsive mechanism, and at least initially is less than corresponds to the deflection of such responsive mechanism, and a flow controller responsive to fluctuations in the rate of flow of the fluid supplied by such valve and arranged to effect adjustment of said valve to compensate for said pressure fluctuations.

6. An arrangement for the control of a physical condition in an apparatus under control, comprising means sensitive to fluctuations in said physical condition, mechanism determining the control limits of said sensitive means, a conduit associated with said apparatus, a fluid-operated valve in said conduit, a pipe for conducting to said valve an operating pressure fluid from a source of supply other than said conduit, and means associated with such pipe for controlling the fluid pressure on said valve and comprising an element movable in response to fluctuations in the rate of flow in said conduit and arranged to vary the fluid pressure on said valve, and means controlled by said sensitive means through said control limit determining mechanism to vary the effect of said element on said fluid pressure according as the controlled physical condition varies beyond the predetermined limits.

7. An arrangement for the control of a physical condition in an apparatus under control, comprising means sensitive to fluctuations in said physical condition, a fluid-conveying conduit associated with said apparatus, a valve in said conduit, flow control means sensitive to changes in the rate of flow in said valve-controlled conduit and associated with the valve for maintaining a predetermined flow through said valve and including an adjustable setting means for predetermining such flow, and means controlled by said sensitive means for adjusting the setting means to make the total correction for changes in the said physical condition in said apparatus beyond predetermined limits and thereby maintain predetermined conditions at the place under control.

8. An arrangement as set forth in claim 7, wherein the means controlled by the sensitive means includes electric contact mechanism and a motor controlled by said contact mechanism and connected with said setting means to adjust the same upon actuation of the motor.

9. An arrangement as set forth in claim 7, including an interrupter mechanism for periodically suspending the influence of the sensitive means on said setting means.

10. The combination with a differential flow controller having an adjustable setting means and adapted to control the flow of a fluid through a valve located in a controlled conduit in accordance with the setting thereof and to make adjustments in the position of the valve in response to changes in the rate of flow through the conduit so as to maintain the rate of flow called for by the setting of the controller, of sensitive means arranged to adjust the setting means of the controller in accordance with departures of a physical condition in an apparatus under control from a predetermined value or range of values, whereby said flow controller operates to maintain predetermined conditions in the controlled apparatus by maintaining the rate of flow through the controlled conduit at the value demanded by the sensitive means irrespective of variations in the supply pressure of the fluid passing through the conduit.

11. An arrangement for the control of a physical condition in an apparatus under control comprising, in combination, a conduit associated with said apparatus, a control valve in said conduit, an adjustable element for determining the setting of said valve, a reversible electric motor geared to said element to move the same a distance corresponding to the degree of movement of the motor, temperature or pressure responsive mechanism arranged to cause operation of said motor in one or the other direction when the controlled physical condition in the apparatus under control departs from a predetermined value or range of values to effect a corresponding adjustment of said element, and a flow controller responsive to changes in the rate of flow in said conduit and operative to modify the adjustment of the control valve to compensate for said changes to maintain the flow demanded by the responsive mechanism, the relative positions of said control valve and the responsive mechanism being independent of each other due to the separate control of said valve by said flow controller.

12. An arrangement for the control of a physical condition in an apparatus under control, comprising sensitive means adapted to respond to fluctuations in the said physical condition, a conduit associated with such apparatus, a pneumatically operated valve in said conduit, a flow controller associated with the valve for adjusting the position of the same to compensate for changes in the rate of flow of the fluid flowing through the conduit, said controller including a normally stationary air nozzle, a flapper controlling said nozzle for regulating the pneumatic pressure on the valve, and flow sensitive means for moving said flapper in accordance with said changes in the rate of flow, and mechanism controlled by said sensitive means at the limits of a predetermined range of movement of said sensitive means for adjusting the position of said nozzle relatively to the flow sensitive means of the flow controller when the controlled physical condition varies beyond corresponding limits.

13. Apparatus for the control of the rate of flow of a fluid through a valve-controlled conduit in response to temperature changes and also to changes in the supply pressure of the fluid, comprising, in combination, a differential pressure flow controller having an adjustable setting device and adapted to be associated with the conduit and with the valve to control the flow of fluid through the valve in accordance with the setting of such flow controller by adjusting the position of the valve in response to departures in the rate of flow in such conduit from that required by the setting thereof, said setting device being unaffected by changes in the rate of flow in the controlled conduit, and temperature sensitive means arranged to adjust the setting device of the flow controller in response to fluctuations in temperature conditions at a selected place.

14. An arrangement for the control of a physical condition in an apparatus under control, comprising sensitive means adapted to respond to fluctuations in the said physical condition from a selected value or range of values, a conduit associated with said apparatus, a valve in said conduit, the rate of flow through the conduit affecting the condition being controlled, a flow controller operating to maintain a predetermined pressure differential at a selected part of said conduit and having an adjustable setting means for predetermining such differential, said controller including mechanism responsive to fluctuations in the rate of flow of the fluid flowing through the valve-controlled conduit and acting to regulate the position of the valve so as to maintain a predetermined flow through said valve as required by the adjustment of such setting means, the position of said setting means being unmodified by said controller mechanism itself, mechanism controlled by said sensitive means and unaffected by said controller mechanism for modifying the adjustment of said setting means to vary the rate of flow to be maintained by the flow controller so as to maintain predetermined conditions at the place under control, and means for keeping said setting means unaffected by said sensitive means within a predetermined range of values of said physical condition.

15. An arrangement for the control of a physical condition in an apparatus under control comprising, in combination, a conduit associated with said apparatus, a pneumatically operated control valve in said conduit, a pipe for conducting an operating fluid under pressure to said valve from a source other than said conduit, means associated with said pipe for governing the pneumatic pressure upon said control valve, mechanism responsive to said physical condition and acting to adjust said governing means to produce a compensating variation in the pressure on the control valve, and means responsive to fluctuations in the rate of flow in said conduit and acting to vary the adjustment of the control valve to compensate for said flow fluctuation to maintain the flow demanded by said responsive mechanism, the relative positions of said control valve and the responsive mechanism being independent of each other due to the independent control of said valve by said flow responsive means.

16. An arrangement for the control of a physical condition in an apparatus under control comprising, in combination, a conduit associated with said apparatus, a pneumatically operated control valve in said conduit, a conduit for conducting compressed air to said valve, a nozzle member and a flapper member controlling the pressure in said compressed air conduit, mechanism responsive to changes in said physical condition in the apparatus under control, means operated by said responsive mechanism for adjusting one of said members to adjust thereby said valve to establish the rate of flow required to maintain said physical condition at the place under control, and differential mechanism sensitive to fluctuations in the rate of flow through the conduit and operating to adjust the other member to modify the adjustment of the valve in accordance with such fluctuations to maintain the rate of flow at the value demanded at any time by the responsive mechanism.

17. An arrangement for the control of a physical condition in an apparatus under control, comprising sensitive means adapted to respond to fluctuations in the said physical condition, a conduit associated with such apparatus, a pneumatically operated valve in said conduit, a flow controller associated with the valve for adjusting the position of the same to compensate for changes in the rate of flow of the fluid flowing through the conduit, said controller including a normally stationary air nozzle, a flapper controlling said nozzle for regulating the pneumatic pressure on the valve, and flow sensitive means for moving said flapper in accordance with said changes in the rate of flow, mechanism controlled by said sensitive means at the limits of a predetermined range of movement of said sensitive means for adjusting the position of said nozzle relatively to the flow sensitive means of the flow controller when the controlled physical condition varies beyond corresponding limits, and electrical contact mechanism operated by the sensitive means and controlling the nozzle actuating mechanism, said contact mechanism determining the limits at which effective control by the sensitive means begins.

18. An arrangement for the control of a physical condition in an apparatus under control, comprising a conduit for supplying to said apparatus a fluid influencing said physical condition, adjustable mechanism governing the rate of flow of said fluid to said apparatus in accordance with the setting of such mechanism, means associated with said apparatus and actuated in response to fluctuations in said physical condition, and mechanism controlled by said means at the limits of a predetermined range of the values of said physical condition for adjusting the setting of said flow governing mechanism.

LAWRENCE C. IRWIN.